(12) United States Patent
Scalzo et al.

(10) Patent No.: US 6,841,083 B2
(45) Date of Patent: Jan. 11, 2005

(54) DEVICE AND PROCESS FOR IMPROVED SCOURING EFFICIENCY

(75) Inventors: Howard Scalzo, Kenilworth, NJ (US); Margaret D'Aversa, Whitehouse Station, NJ (US); Royce Frederick, South Bound Brook, NJ (US)

(73) Assignee: Ethicon, Inc., Somerville, NJ (US)

( * ) Notice: Subject to any disclaimer, the term of this patent is extended or adjusted under 35 U.S.C. 154(b) by 168 days.

(21) Appl. No.: 10/184,043

(22) Filed: Jun. 27, 2002

(65) Prior Publication Data

US 2004/0000376 A1 Jan. 1, 2004

(51) Int. Cl.[7] .......................... B01D 53/22; B29B 13/00; B29C 47/00
(52) U.S. Cl. ........................ 216/91; 134/102.1; 134/184
(58) Field of Search ............................ 134/102.1, 102.2, 134/184, 113, 1.3, 137, 30, 37, 94.1; 216/91, 83, 97; 156/345.11; 438/689

(56) References Cited

U.S. PATENT DOCUMENTS

| | | |
|---|---|---|
| 5,192,456 A | 3/1993 | Ishida et al. |
| 5,248,424 A | 9/1993 | Cote et al. |
| 5,639,373 A | 6/1997 | Mahendran et al. |
| 5,783,083 A | 7/1998 | Henshaw et al. |
| 5,910,250 A | 6/1999 | Mahendran et al. |
| 6,042,677 A | 3/2000 | Mahendran et al. |
| 6,156,200 A * | 12/2000 | Zha et al. ............... 210/321.89 |

FOREIGN PATENT DOCUMENTS

| | | |
|---|---|---|
| WO | 9828066 | 7/1998 |
| WO | 0018498 | 4/2000 |

* cited by examiner

*Primary Examiner*—Gregory Mills
*Assistant Examiner*—Sylvia R. MacArthur

(57) ABSTRACT

A device for scouring a coating from a fibrous material includes a tank for immersing a plurality of fibers in scouring solvent therein. The device also includes a bubbling device positioned therein and having a chamber formed between a base plate and a cover plate with a plurality of holes. The plurality of fibers is mounted within the tank above the cover plate and holes of the bubbling device, so that gas bubbles produced thereby move through the scouring solvent and through the plurality of fibers. The holes are arranged in a pattern on the cover plate that corresponds to a shape assumed by the plurality of fibers when mounted within the tank. A process for scouring a coating from a fibrous material is also disclosed and involves immersing a plurality of fibers in a scouring solvent and producing a plurality of gas bubbles that move through the solvent and the plurality of fibers. The process also involves arranging and mounting the plurality of fibers to assume a shape that corresponds to a pattern formed by the plurality of holes.

8 Claims, 5 Drawing Sheets

DEVICE AND PROCESS FOR IMPROVED SCOURING EFFICIENCY

FIELD OF THE INVENTION

The present invention relates to a device and a process for more efficiently removing chemical coatings from fibers.

BACKGROUND OF THE INVENTION

Various synthetic polymers, including, but not limited to, polyethylene, PET, polypropylene, polyamides, polyglactin (VICRYL), polyglycolic acid (DEXON), poliglecaprone (MONOCRYL) and poly(L-lactide/glycolide) (PANACRYL), are used to make surgical sutures, including absorbable sutures. Sutures may be smooth, single-strand sutures, or "monofilaments", or they may be multiple strands woven together, i.e., "braided" sutures. In addition, the desired characteristics of the final suture products, including, but not limited to, tensile strength, absorption rate, elasticity, flexibility and surface morphology, determines, among other things, the type of material that is used to make them, as well as whether they are formed as monofilaments or braided fibers.

During the suture manufacturing process, the suture fibers are produced using one or more formation processes such as extrusion, polymerization, braiding, scouring and coating. As they emerge from the aforesaid formation processes, the suture fibers are often coated with a spin finish, such as a solution of glycerol monostearate and mineral oil (GMS/MO), for the purpose of facilitating further handling and processing of the fibers. The manufacturing process results in the formation of very long fibers coated with a spin finish which are wrapped and/or folded into skeins of more manageable size and shape.

Final coatings, such as caprolactone, polybutilate, polyglycolide, wax and other substances are sometimes applied to suture products for purposes such as providing an outer surface on braided fibers thereby minimizing tissue trauma, increasing the knot tensile strength of the suture, or altering the absorption rate of the suture. Before such final coatings can be applied, however, the spin finish must be removed from the outer surface of the suture fibers.

Efficient removal of the spin finish from suture fibers, especially braided suture fibers, is important because, the spin finish can significantly interfere with the distribution of the final coating throughout the braided fibers if a significant amount of spin finish remains on the braided fibers when the final coating is applied. If the final coating is not able to penetrate the braid and become fully distributed throughout the braided fibers, the resulting braided suture may not meet the required specifications, including, but not limited to, the smoothness of the outer surface, the knot tensile strength or the absorption rate. The efficient removal of the spin finish is the focus of the present invention.

Typically, the spin coating is removed from braided suture fibers by immersing one or more skeins of the suture fibers in an appropriate solvent which is pumped through scouring equipment, such as a conventional scouring bath tank. This method removes the spin coating efficiently from the suture fibers as long as the spin coating is highly soluble in the particular solvent that is used. For example, ethyl acetate is used as the solvent where the suture fibers are made of polyglactin (VICRYL) and the spin finish is made of GMS/MO because GMS/MO is highly soluble in ethyl acetate and, therefore, it will remove a satisfactory amount of the GMS/MO spin finish. If, however, the suture fibers are made of poly(L-lactide/glycolide (PANACRYL) with a spin finish made of GMS/MO, ethyl acetate cannot be used as the solvent because it will attack and destroy the poly(L-lactide/glycolide (PANACRYL) suture fibers. Thus, where the suture fibers are made of poly(L-lactide/glycolide (PANACRYL) having a spin finish made of GMS/MO, isopropyl alcohol is used as the solvent. Unfortunately, GMS/MO is not totally soluble in isopropyl alcohol. Thus, a double scouring process is currently used to remove the GMS/MO from poly(L-lactide/glycolide (PANACRYL) suture fibers, which requires double the time and double the amount of isopropyl alcohol to produce a given amount of suture product than is required for a single scouring process.

With the foregoing in mind, the present invention was developed to increase the scouring efficiency of isopropyl alcohol when used to remove GMS/MO spin finish from braided suture fibers made of poly(L-lactide/glycolide (PANACRYL). It is noted that attempts to increase the scouring efficiency by more conventional methods, including, but not limited to, increasing the fluid flow (i.e., fluid agitation) throughout the tank with a stirring bar and different pumping rates, proved to be unsatisfactory. More particularly, the aforesaid attempts resulted in non-uniform fluid flow within the tank, including the creation of several dead zones, or inactive areas, in which little or no fluid flow occurred.

There have been some notable developments in the wastewater treatment field relating to scouring or cleansing fibrous or filamentary matter with a combined flow of liquid and gas, especially for the prevention of fouling of the filtering membranes of the wastewater treatment devices. For example, WO 98/28066 and WO 00/18498 disclose an apparatus and method for cleaning membrane filtration modules, including membranes made of fibers, as an alternative to conventional backwashing. This disclosure discusses injecting and entraining air bubbles in a liquid stream using a venturi arrangement positioned underneath vertically oriented membranes, such that the air bubbles flow upward along a path parallel to the membranes surfaces requiring cleaning. The membranes discussed in these documents are porous membranes used to filter wastewater and they are arranged such that the surfaces requiring cleaning are oriented vertically. The air bubbles are introduced into an upwardly flowing liquid stream, whereby the air bubbles flow along a path parallel to the membrane surfaces to be cleaned. Thus, by physical scrubbing, the air bubbles remove and prevent fouling of the membranes, i.e., accumulated substances, including solids, particulates, organic matter and biological growth, are removed from the surfaces of such membranes. More particularly, the gas bubbles bump and impact the fibers, thereby loosening and shaking the accumulated solids loose therefrom. It is noted that these references suggest the use of oxygen, air, gaseous chlorine or ozone for the gas.

U.S. Pat. Nos. 5,910,250 and 6,042,677 disclose a baffle used to convert fine aerating gas bubbles in a liquid flow to coarse gas bubbles which then travel upwardly and parallel to the surfaces of vertically oriented fibers to scrub the fibers and remove fouling therefrom. The fibers are hollow fiber membranes, or capillary tubes, and are arranged in a skein and their purpose is to separate a desired permeate from a large body of multicomponent substrate, such as fruit juices to be clarified or wastewater containing particulate matter, especially organic matter. Thus, the air bubbles remove solids and particulates from the fibers by physical scrubbing in which the gas bubbles bump and impact the fibers, thereby loosening and shaking the accumulated solids loose therefrom. In addition, these references specify that the fibers are long enough to sway within a bubble zone, which contributes to the scrubbing action of the coarse bubbles.

U.S. Pat. Nos. 5,192,456, 5,639,373 and 5,783,083 also disclose devices having vertically oriented fibrous membranes for filtration of wastewater and the use of gas bubbles in an upward liquid flow, along the surfaces of the fibers, to prevent and scrub fouling from the fiber surfaces. U.S. Pat. No. 5,192,456 discloses that the gas is introduced into the liquid by an air-blowing pipe and the bubbles are created by a mechanical agitator which stirs the liquid-air mixture. In U.S. Pat. Nos. 5,639,373 and 5,783,083 the gas bubbles are introduced into the liquid flow by air tubes or manifolds with holes, which release the gas as bubbles into the liquid. In these devices, the gas bubbles function to physically scrub solids and particulates accumulated on the fiber surfaces by bumping and impacting the fibers to shake the accumulated solids loose therefrom.

U.S. Pat. No. 5,248,424 discloses a device for withdrawing permeate from a liquid substrate that includes fibers deployed as a substantially horizontally oriented skein. The device also includes a gas distributing pipe having holes that is positioned underneath the fiber skein and the gas bubbles released thereby into the liquid substrate cause the fiber skein to assume an arc shape. Due to the arrangement of the fiber skein and the gas distributing pipe, the gas bubbles travel with the substrate in a direction that is substantially perpendicular to the lengths of the fibers, as opposed to along their lengths as disclosed in the above-discussed prior art references. However, like the above-discussed prior art, the substances to be cleaned from the surfaces of the fibers in U.S. Pat. No. 5,248,424 are solids, including organic molecules and colloidal or suspended solids. In addition, the solids are removed from the fibers by the bumping and impacting action of the gas bubbles on the fibers, thereby shaking the accumulated solids loose therefrom.

The device of the present invention addresses the shortcomings of the existing apparatus and process for scouring coatings off of fibrous materials by improving the agitation of the solvent in a single batch process whereby the solvent is evenly distributed through the fibrous material, thereby minimizing dead zones, maximizing contact of the solvent with the coating on the surfaces of the fibrous material and eliminating the need to perform a double batch process.

SUMMARY OF THE INVENTION

A device in accordance with the present invention used for scouring a coating from a fibrous material includes a tank that is sized and shaped to receive a plurality of fibers therein for immersing the plurality of fibers in a scouring solvent which is also contained within the tank. The device also includes producing means for producing gas bubbles which is positioned in the tank so that gas bubbles produced thereby are movable through the scouring solvent and through the plurality of fibers. The movement of the gas bubbles agitates the plurality of fibers and the scouring solvent and, thereby, increases contact between the scouring solvent and individual fibers of the plurality of fibers. More particularly, the producing means has a base plate and a cover plate with a plurality of holes therethrough. The base plate and cover plate are connected to one another to form a supplying means, or chamber, therebetween which is in communication with the holes and into which pressurized gas is supplied through one or more gas inlets. The plurality of fibers, which may be a skein of suture fibers, is mounted within the tank on mounting means, such as pegs, such that the plurality of fibers is positioned above the cover plate and holes so that gas bubbles emerging from the holes rise through the plurality of fibers and scouring solvent. The holes are arranged in a pattern on the cover plate that corresponds to a shape assumed by the plurality of fibers when mounted within the tank.

A process is provided for scouring a coating from a fibrous material and includes immersing a plurality of fibers in a scouring solvent and producing a plurality of gas bubbles that move generally along a path through the solvent and through the plurality of fibers, whereby the plurality of fibers and the scouring solvent are agitated and the scouring efficiency of said solvent is enhanced. The process also involves supplying pressurized gas to a plate having a plurality of holes and arranging the plurality of fibers to assume a shape that corresponds to a pattern formed by the plurality of holes. The process also involves mounting the plurality of fibers above the holes so that the individual fibers of the plurality of fibers are oriented in a first direction and the gas bubbles move through the plurality of fibers in a direction perpendicular to the first direction.

BRIEF DESCRIPTION OF THE DRAWINGS

For a better understanding of the present invention, reference is made to the following detailed description of a preferred embodiment of the present invention considered in conjunction with the accompanying drawings, in which.

DETAILED DESCRIPTION OF THE INVENTION

Figure 1:
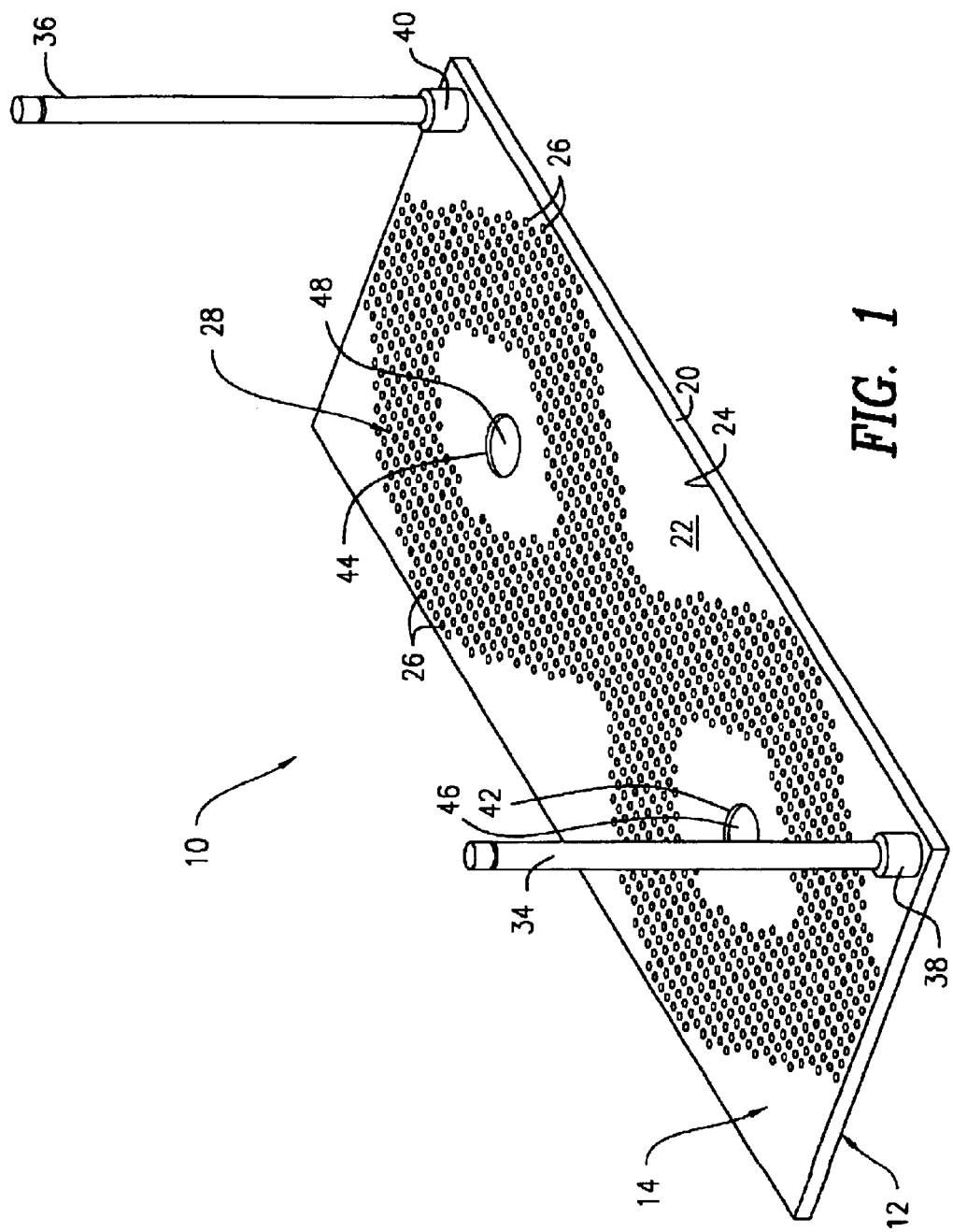
FIG. 1 is a perspective view of a bubbling device in accordance with the present invention.
Figure 2:
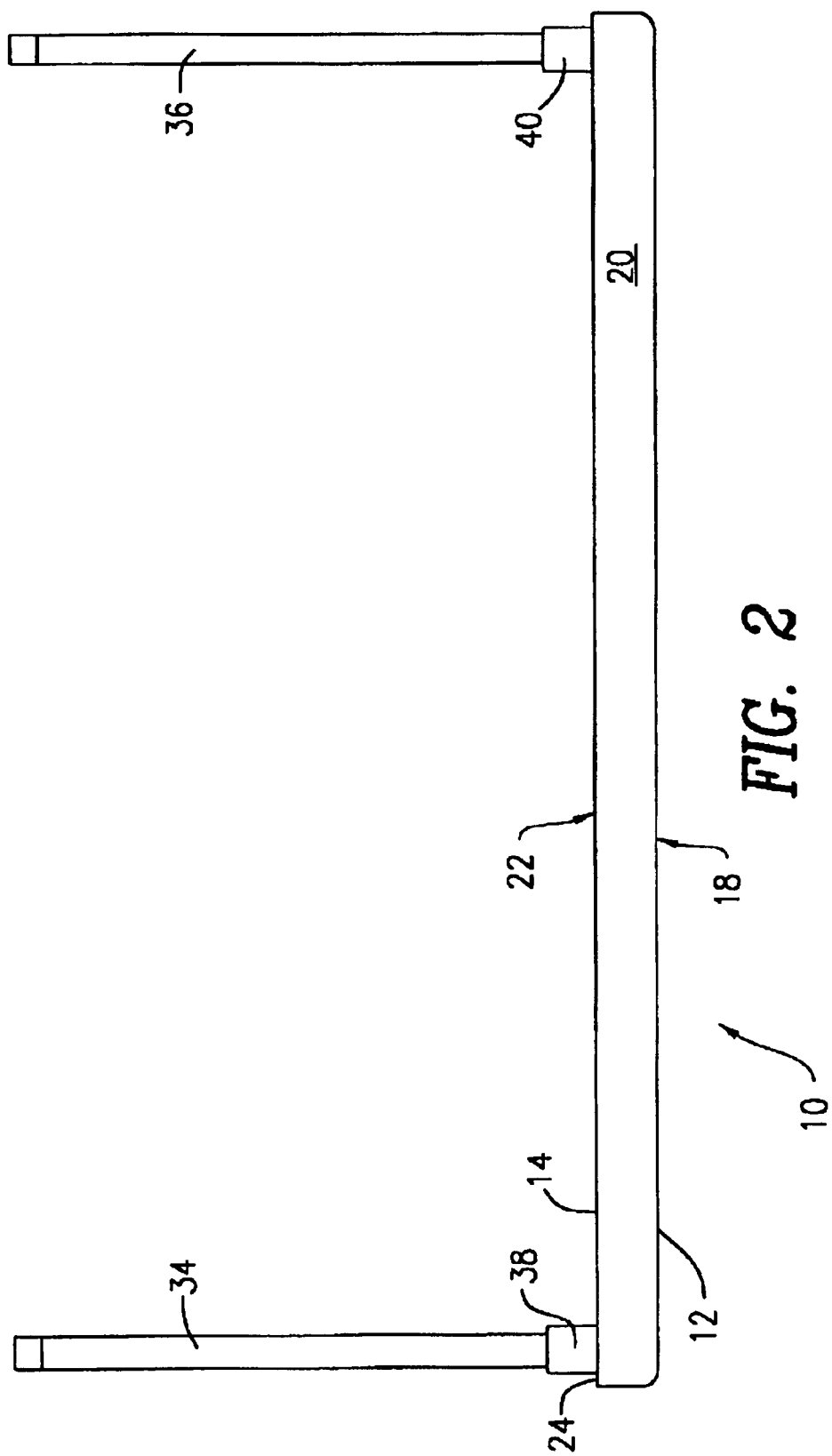
FIG. 2 is an elevational front plan view of the bubbling device.
Figure 3:
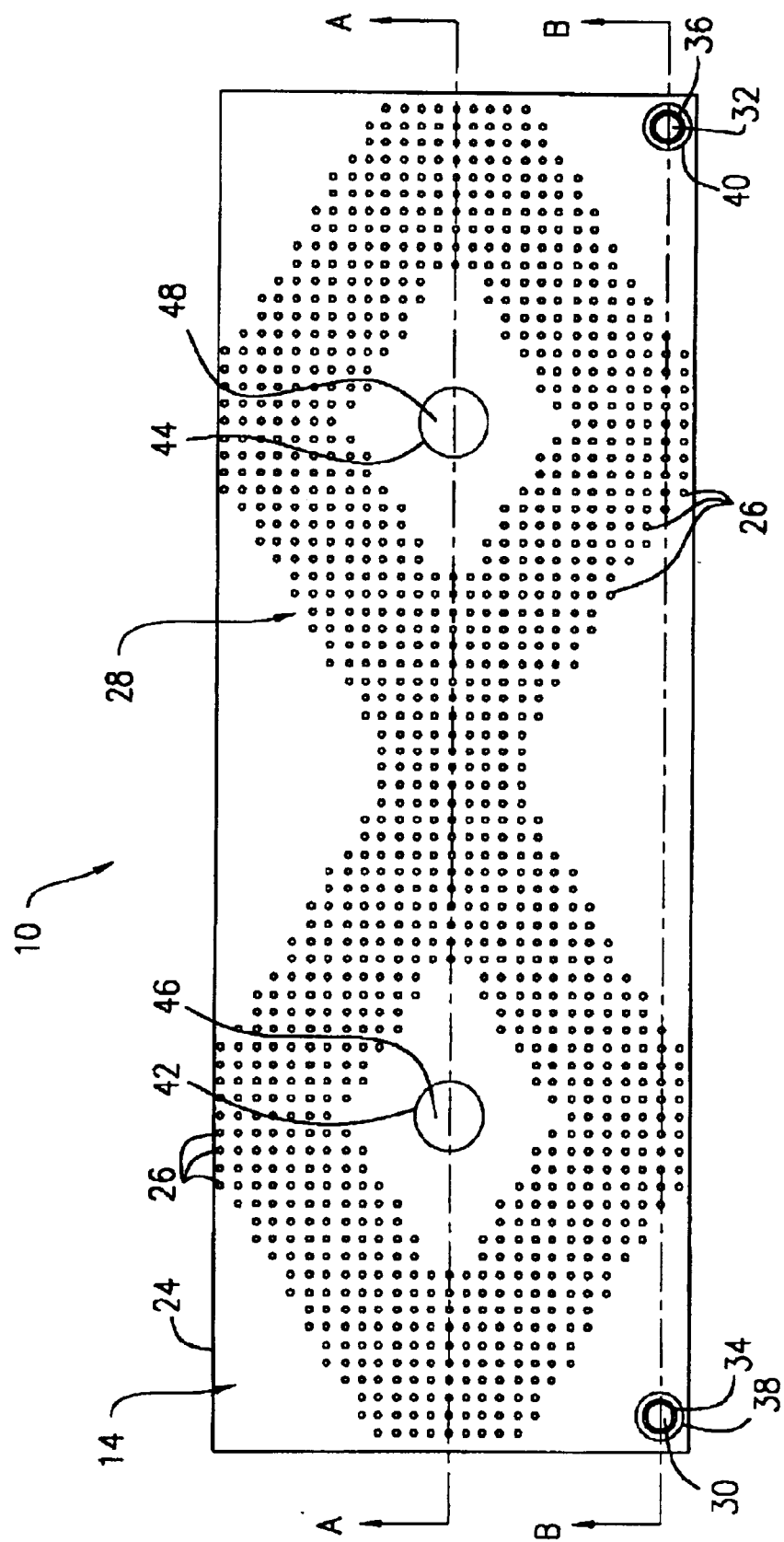
FIG. 3 is a top plan view of the bubbling device of FIG. 1.
Figure 4:
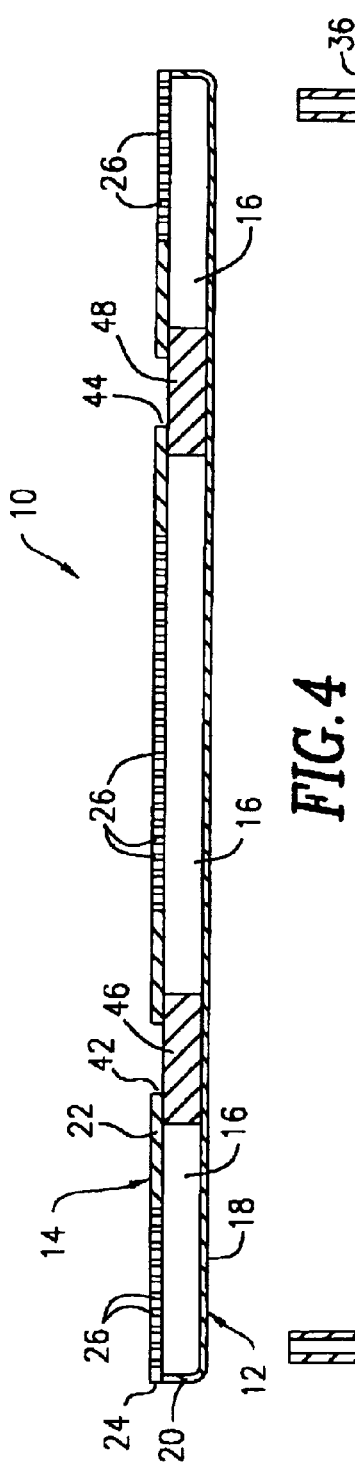
FIG. 4 is a cross-sectional view of the bubbling device, taken along section line A—A of FIG. 3 and looking in the direction of the arrows.
Figure 5:
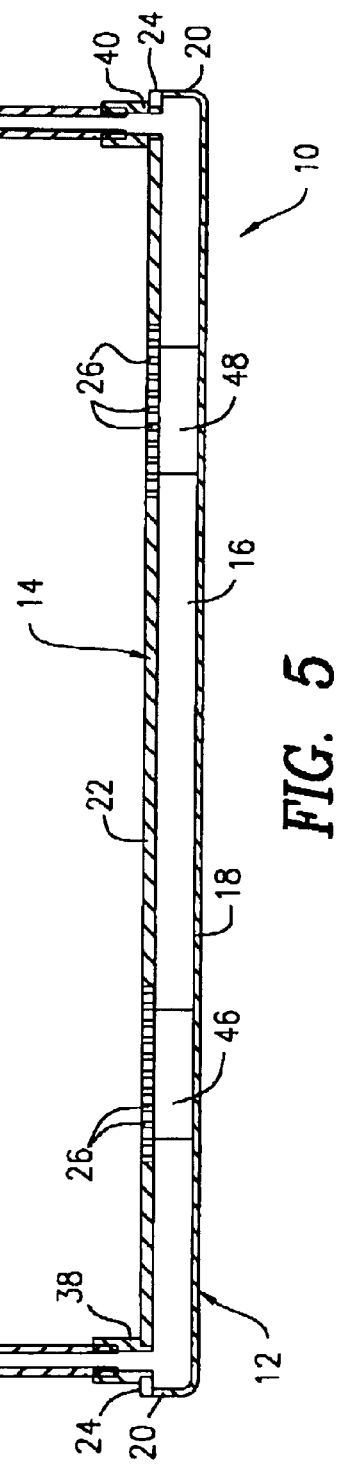
FIG. 5 is a cross-sectional view of the bubbling device, taken along section line B—B of FIG. 3 and looking in the direction of the arrows.

With reference to FIGS. 1–5, in general, and FIGS. 1 and 2, in particular, a producing means for producing gas bubbles, in this instance, a bubbling device 10, of the present invention includes two plates 12, 14 that are affixed to one another in an air-tight manner, by conventional means, including, but not limited to, welding or gluing, thereby forming a supplying means, or in other words, a chamber 16, between them. More particularly, one plate 12 is a base plate 12 having a substantially planar body 18 and a raised peripheral edge 20 thereabout (see also FIGS. 4–6), the height of which defines the height of the chamber 16. The other plate 14 is a cover plate 14 having a substantially planar body 22 with a flat peripheral edge 24. As can be seen in FIGS. 4 and 5, the top plate 12 and the cover plate 14 are affixed to one another at their peripheral edges 20, 24 to form the chamber 16 therebetween.

In the preferred embodiment shown in detail in FIGS. 1–5, the base and cover plates 12, 14 are generally rectangular shaped, having bodies 18, 22 that are each approximately 39.0 inches in length and 13.75 inches wide and 0.078 inch thick. The raised peripheral edge 20 of the base plate 12 is approximately 0.5 inches in height. It is noted that the base plate 12 and the cover plate 14 may be differently shaped, for example, circular or square, and may have different dimensions than those specified above, depending upon the size and shape of the scouring equipment with which it will be used, as described hereinbelow. The base and cover plates 12, 14 can be made of any corrosion resistant materials, preferably corrosion resistant metal, such as stainless steel or any polymer not affected by the scouring solvent and having mechanical integrity sufficient to withstand gas pressure within the chamber 16.

With reference to FIGS. 1 and 3–5, the cover plate 14 also includes a plurality of bubble-producing holes, or pinholes 26, through its body 22 (see also FIGS. 3–5). As shown in FIGS. 4 and 5 in particular, each pinhole 26 is in communication with both the chamber 16 and the space surrounding the bubbling device 10, for reasons which will become apparent hereinafter. The pinholes 26 are evenly spaced apart from one another and are arranged in a pattern 28 (see especially FIGS. 1 and 3) that corresponds to the shape of a skein of fibers that will be positioned proximate to the cover plate 14 for removal of spin finish therefrom, as will be described in further detail hereinafter (see, e.g., FIG. 6).

With reference particularly to the present embodiment of the present invention shown in FIGS. 1 and 3, the pinhole pattern 28 of the cover plate 14 of the preferred embodiment has a figure "8" shape, for reasons which will become apparent hereinafter. The pinholes 26 should each have a diameter between approximately 0.020 inches and approximately 0.250 inches, and preferably between approximately 0.0625 inches and approximately 0.125 inches. In the present embodiment, the pinholes 26 each have a diameter of approximately 0.0625 inches and are spaced approximately 0.5 inches apart from one another.

With reference now to FIGS. 3 and 5, the cover plate 14 also has two gas inlets 30, 32, which are in communication with the chamber 16 and are located proximate to the flat peripheral edge 24 of the body 22, on opposite sides of the pinhole pattern 28. An inlet conduit 34, 36 is attached to each gas inlet 30, 32, respectively (see especially FIGS. 1,2 and 5), in a fluid-tight manner by a conventional fitting 38, 40, respectively (such as shown in FIGS. 1, 2, 3, and 5), for delivering gas into the chamber 16 through the gas inlets 30, 32. In the present embodiment of the present invention, the gas inlets 30, 32 are approximately 1.125 inches in diameter. The inner diameter of each of the inlet conduits 34, 36 is approximately 0.5 inches and they are each approximately 14.0 inches long. The fittings 38, 40 are each sized and shaped in accordance with well-known principles to securely and sealingly attach each of the inlet conduits 34, 36 to its respective gas inlet 30, 32.

It is noted that there may be a different number of gas inlets with an inlet conduit affixed to each, and the gas inlets do not have to be located on the cover plate 14. For example, although not shown in the figures, there could be only one gas inlet with an inlet conduit affixed thereto, or there could be three or more gas inlets, each with an inlet conduit affixed thereto. Furthermore, the gas inlets may be located, for example, on the raised peripheral edge 20 of the base plate 12 (not shown), rather than on the body 22 of the cover plate 14. In addition, where the gas inlets are located on the body 22 of the cover plate 14, they do not have to be positioned proximately to the flat peripheral edge 24 of the body 22 of the cover plate 14. For example, although not shown, the gas inlets 30, 32 could be positioned closer to the middle of body 22. It has been determined, however, that better distribution of gas bubbles is achieved where the cover plate 14 has two gas inlets 30, 32 positioned proximately to the flat peripheral edge 24 of the body 22 on opposite sides of the pinhole pattern 28.

The cover plate 14 also includes two substantially circular stiffener openings 42, 44, which are best viewed in FIGS. 1, 3 and 4 and which provide attachment locations for inhibiting means, such as two stiffeners 46, 48 (see especially FIGS. 1 and 4). The purpose of the stiffeners 46, 48 is to inhibit or prevent the outward deformation of the plates 12, 14 when gas is supplied to the chamber 16, as described hereinafter. Each stiffener 46, 48 is puck-shaped with a substantially circular top view (not shown) and a thickness equal to the height of the raised peripheral edge 20 of the base plate 12 (see FIGS. 4 and 5). In addition, each stiffener 46, 48 has a diameter that is slightly larger than the diameter of its corresponding stiffener opening 42, 44, respectively, such that, when positioned within the chamber 16, each stiffener 46, 48 completely blocks its corresponding stiffener opening 42, 44, respectively (see FIGS. 3 and 4). Each stiffener 46, 48 is affixed to the bodies 18, 22 of both the base plate 12 and the cover plate 14, respectively, by conventional means such as, but not limited to, welding or gluing. In the present embodiment, the stiffener openings 42, 44 are each centrally positioned within a loop of the figure "8" of the pinhole pattern 28. In the present embodiment, each stiffener opening 42, 44 is approximately 2.0 inches in diameter and each stiffener 46, 48 has a diameter of approximately 2.5 inches and a height of approximately 0.5 inches.

It is noted that the stiffeners 46, 48 can be shaped differently than shown in the figures, as long as the stiffeners 46, 48 are large enough to completely block their corresponding stiffener openings 42, 44, respectively, which can also be, but do not have to be, differently shaped than the circular holes shown in FIGS. 1 and 3. For example, instead of puck-shaped, the stiffeners 46, 48 could have an oval, square or rectangular top view, but should still have a thickness equal to the height of the raised peripheral edge 20 of the base plate 12. In the present embodiment, the stiffener openings 42, 44 are each centrally positioned within a loop of the figure "8" of the pinhole pattern 28. It is further noted that a different number of stiffeners 46, 48 and stiffener openings 42, 44 may be provided. As will be apparent to one of ordinary skill in the art, the number of stiffeners 46, 48 and stiffener openings 42,44 will depend upon how many are required to prevent the base and cover plates 12, 14 from bowing outwardly, which will, in turn, depend upon the size and shape of the base and cover plates 12, 14. For example, where the base and cover plates 12, 14 are larger than those described in connection with the present embodiment of the present invention, or where the plates 12, 14 are irregularly shaped, more stiffeners 46, 48 and stiffener openings 42, 44 would probably be required.

Referring again to FIGS. 1 and 6, the bubbling device 10 as a whole is sized and shaped to fit within scouring equipment, such as the scouring bath tank 50 which is shown schematically in FIG. 6. The scouring bath tank 50 is a well-known and conventional device into which a skein of fibers 52 (such as, for example, a skein of fibers from which surgical sutures are made) is placed, as described hereinafter, for the purpose of scouring a previously-applied spin finish coating off of the fibers using a solvent (not shown). It is noted that the solvent used to scour the fibers in the skein 52 must be capable of at least partially dissolving the spin finish from the fibers to be scoured. For example, where the fibers to be scoured are poly(L-lactide/glycolide) suture fibers and the previously-applied spin finish is a solution of glycerol monostearate and mineral oil (i.e., GMS/MO), the solvent that is generally chosen for the aforesaid scouring is isopropyl alcohol.

Figure 6:
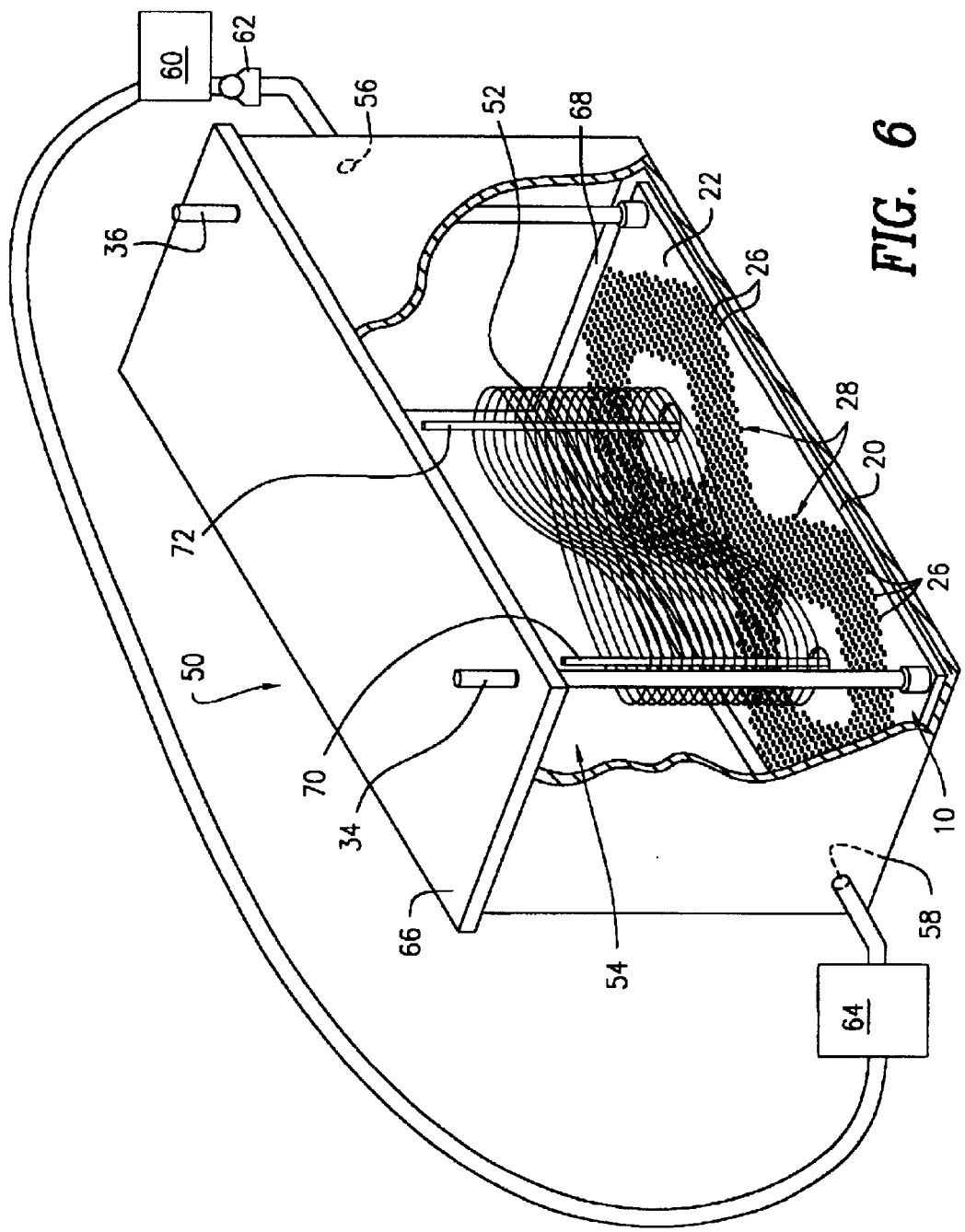
FIG. 6 is a cut-away perspective view of the bubbling device in its working environment.

With reference still to FIG. 6, the scouring bath tank 50 has an interior chamber 54 and an inlet 56 that is in communication with the interior chamber 54 for the purpose of supplying solvent (not shown) into the interior cavity 54. In addition, the scouring bath tank 50 has an outlet 58 that is also in communication with the interior chamber 54 for facilitating removal of the solvent from the scouring bath tank 50. The solvent is generally held within a storage tank 60 (shown schematically in FIG. 6) until it is moved through the interior chamber 54 of the scouring bath tank 50 by a suitable, conventional device, such as a pump 62 (shown schematically only in FIG. 6). It is noted that while the pumping of the solvent into and out of the interior chamber 54 of the scouring bath tank 50 provides some agitation, it is sometimes not enough to efficiently remove the spin finish from the fibers.

A filter 64 (shown schematically in FIG. 6) is provided downstream of the outlet 58 of the scouring bath tank 50 for filtering spin finish that is removed from the fibers out of the solvent, which is then recycled and pumped back into the storage tank 60 for reuse. As shown in FIG. 6, the scouring bath tank 50 may additionally have a cover 66 with openings (not shown) through which the conduits 34, 36 of the bubbling device 10 extend for connection to a gas supply (not shown).

With continued reference to FIG. 6, the interior chamber 54 of the scouring bath tank 50 includes an interior floor 68. The bubbling device 10 is positioned within the interior chamber 54 of the scouring bath tank 50 such that the base plate 12 of the bubbling device 10 rests substantially levelly upon the interior floor 68. The scouring bath tank 50 includes mounting means, such as two vertical pegs 70, 72, upon which the skein of fibers 52 is mounted by wrapping it about the pegs 70, 72. The skein 52 may be held loosely together by threads (not shown) tied thereabout. The two vertical pegs 70, 72 are positioned within the interior chamber 54 of the scouring bath tank 50, with the skein of fibers 52 wrapped thereon, on top of the cover plate 14 of the bubbling device 10. Furthermore, the two pegs 70, 72 are spaced apart from one another such that the skein 52 assumes a figure "8" shape that correspond to and is substantially aligned with the figure "8" shape of the pinhole pattern 28 of the cover plate 14, for reasons which will become apparent hereinafter. It is noted that the mobility of the fibers of the skein 52 can be adjusted by spacing the pegs 70, 72 closer together or farther apart from one another so that the fibers remain more or less flexible and mobile, depending on the flexibility that is desired for a particular scouring operation.

It is noted that the specific size and shape of the bubbling device 10 of the present invention may be different from that which is shown and described herein, as long as the bubbling device 10 fits into the scouring bath tank, or other scouring equipment, and such that the base plate 12 rests substantially levelly upon the interior floor 68 of the scouring equipment. In addition, the shape of the pinhole pattern 28 and the shape of the skein of fibers 52 when wrapped around the vertical pegs 70, 72 do not have to be figure "8"'s. For example, the shapes of the pinhole pattern 28 and the skein 52 may be oval or include additional twists. However, where the shapes of the pinhole pattern 28 and the skein 52 are substantially the same as one another and are alignable with one another, the efficiency of the bubbling device 10 will be maximized.

With reference still to FIG. 6, the operation of the bubbling device 10 of the present invention to improve the scouring efficiency of conventional scouring equipment, such as a scouring bath tank 50, will now be described. Initially, the souring bath tank 50, the skein of fibers 52 and the bubbling device 10 are positioned relative to one another as described hereinabove and shown in FIG. 6. The solvent (not shown) is pumped into the interior chamber 54, through the inlet 56, until the interior chamber 54 is substantially filled and, in any case, such that the skein 52 is completely immersed in the solvent. The solvent exits the interior chamber 54 through the outlet 58 at a rate that maintains a level of solvent within the tank 50 that is sufficient to keep the skein 52 completely immersed in the solvent. The flow of the solvent through the interior chamber 54 provides some mechanical agitation and the solvent immediately begins to attack and dissolve the spin finish coating from the fibers of the skein 52.

After the level of solvent in the interior chamber 54 has been sufficiently stabilized, gas (not shown) is supplied to the chamber 16 of the bubbling device 10, through the inlet conduits 34, 36 and gas inlets 30, 32 of the cover plate 14. While air or nitrogen are the preferred gases for use with the bubbling device 10 of the present invention, other known inert gases, such as oxygen, are also suitable. The gas should be supplied to the bubbling device 10 at a pressure of between approximately 15 pounds per square inch (psi) and approximately 90 psi, and more preferably between approximately 30 psi and approximately 50 psi.

The gas (not shown) exits from the chamber 54 through the pinholes 26 in the form of small gas bubbles (not shown). The gas bubbles rise upwardly through the solvent and through the fibers of the skein 52, along a path that is substantially perpendicular to the lengths of the fibers. The motion of the bubbles increases the mechanical agitation of the solvent and fibers and also increases the contact between the solvent and the spin finish on the fibers, which thereby produces an increased scouring efficiency.

It is noted that smaller gas bubbles are better for increasing the scouring efficiency of the solvent. A greater number of gas bubbles will also produce better results. The size of the gas bubbles is determined by the size of the pinholes 26 and the inlet pressure of the gas. As is clear to persons skilled in the art, an increase in the number of pinholes 26 will produce more bubbles within a given time period for a given pinhole size. It is further noted that increasing the gas inlet pressure will produce a greater number of gas bubbles within a given time period for a given pinhole size.

The following examples are provided to illustrate the improved scouring efficiency achieved by the bubbler device 10 of the present invention.

EXAMPLE 1

Four separate skeins of size 2 poly(L-lactidelglycolide) (i.e., PANACRYL) braided suture fibers having a spin finish made of a solution of glycerol monostearate and mineral oil (GMS/MO) thereon were scoured in a conventional scouring bath tank using isopropyl alcohol (IPA).

Two skeins of PANACRYL were scoured without using the bubbling device of the present invention, but instead employing a slightly increased mechanical agitation without damaging the PANACRYL fibers.

In Process No. 1, the first PANACRYL skein was scoured by IPA using manual mechanical agitation of the solvent and fibers in the scouring bath tank for 20 minutes and achieved removal of approximately 39% of the GMS/MO.

In Process No. 2, the second PANACRYL skein was also scoured by IPA using manual mechanical agitation of the solvent and fibers in the scouring bath tank for 20 minutes and achieved removal of approximately 33% of the GMS/MO.

The other two skeins of PANACRYL were scoured using a rough prototype of the present invention including flexible tubing of 0.25 inch diameter coiled to an overall dimension of approximately 8 inches in diameter and having pinholes of approximately 0.0625 inch in diameter being roughly evenly spaced apart. The skein of fibers was mounted above the tubing arrangement.

In Process No. 3, the third PANACRYL skein was scoured by IPA using IPA and compressed air was supplied to the prototype bubbling device at an inlet pressure of 20 psi for 20 minutes, thereby forming a plurality of upwardly flowing gas bubbles which agitated the solvent and the fibers. This scouring process achieved removal of approximately 54% of the GMS/MO, which is a significant improvement over either of the aforesaid scouring processes performed without any bubbling device.

In Process No. 4, the fourth PANACRYL skein was also scoured using IPA and compressed air was again supplied to the prototype bubbling device at an inlet pressure of 20 psi for 20 minutes, thereby forming a plurality of upwardly flowing gas bubbles which agitated the solvent and the fibers. This scouring process achieved removal of approximately 54% of the GMS/MO, which is a significant improvement over either of the aforesaid scouring processes performed without any bubbling device.

The resulting data for each of the aforesaid four scouring processes is summarized in Table 1 below.

TABLE 1

Size 2 PANACRYL (same lot)

| Process No. | Pre-Scour Mass GMS/MO (g) | Post-Scour Mass GMS/MO (g) | Mass GMS/MO Removed (g) | Percent Removed |
| --- | --- | --- | --- | --- |
| 1 | 0.1167 | 0.0714 | 0.0453 | 39% |
| 2 | 0.1159 | 0.0776 | 0.0383 | 33% |
| 3 | 0.1006 | 0.0464 | 0.0542 | 54% |
| 4 | 0.1136 | 0.0521 | 0.0615 | 54% |

EXAMPLE 2

Five separate skeins of size 2 poly(L-lactide/glycolide) (i.e., PANACRYL) braided suture fibers from five different production lots, each having a GMS/MO spin finish thereon, were scoured in a conventional scouring bath tank using IPA and a bubbling device in accordance with the present invention. These five batch processes (of Example 2) achieved even more efficient removal of the GMS/MO, in less time, compared to the processes discussed above in Example 1, including those that used a bubbling device in accordance with the present invention.

More particularly, the particular bubbling device used to scour these five skeins was sized and shaped as discussed and shown hereinabove in connection with the preferred embodiment of the bubbling device 10. More particularly, the base and cover plates were approximately 39.0 inches in length, 13.75 inches wide and 0.078 inch thick. The pinholes were arranged in a figure "8" shape on the cover plate of the bubbling device and the skein was arranged on the vertical pegs in a figure "8" shape that aligned with the pinhole pattern. Each of the pinholes was approximately 0.0625 inches in diameter and they were spaced approximately 0.5 inch apart from one another. The gas inlets, stiffener openings and stiffeners were also sized and shaped as described above in connection with the preferred embodiment of the bubbling device.

Each PANACRYL skein (i.e., Lot Nos. 1–5) was scoured by IPA at a flow rate of 10 gallon per minute (gpm) through the scouring bath tank and compressed air was supplied to the bubbling device at an inlet pressure of 30 psi, for 15 minutes, thereby forming a plurality of upwardly flowing gas bubbles which agitated the solvent and the fibers. This scouring process achieved removal of approximately 97% of the GMS/MO for Lot No. 1, which is clearly a significant further improvement over the scouring processes discussed hereinabove in Example 1, wherein a prototype bubbling device was employed. The results for the remaining four batches, i.e., Lot Nos. 2–4, showed removal of approximately 95% of the GMS/MO. Again, these results are clearly a significant further improvement over the scouring processes discussed in Example 1.

The resulting data for each of the aforesaid four scouring processes, as well as the average results for the typical single scouring batch process (Single) and the average results for the typical double scouring batch process (Double), are summarized in Table 2 below.

TABLE 2

Size 2 PANACRYL (different lots)

| Lot No. | Pre-Scour GMS/MO (ppm) | Post-Scour GMS/MO (ppm) | GMS/MO Removed (ppm) | Percent Removed |
| --- | --- | --- | --- | --- |
| 1 | 47663 | 1402 | 46261 | 97% |
| 2 | 42305 | 2076 | 40229 | 95% |
| 3 | 48969 | 2600 | 46369 | 95% |
| 4 | 48925 | 2612 | 46313 | 95% |
| 5 | 51877 | 2608 | 49269 | 95% |
| Single | 23369 | 6907 | 16462 | 70% |
| Double | 11164 | 3973 | 7191 | 64% |

It is noted that the scouring process of the present invention, using the bubbler device 10 of the present invention, achieved significantly improved results compared to the currently used single batch and double batch processes, which achieved removal of only 70% and 64% of the GMS/MO, respectively, when used to scour size 2 PANACRYL.

It will be understood that the embodiments described herein are merely exemplary and that a person skilled in the art may make many variations and modifications, including but not limited to those discussed hereinabove, without departing from the spirit and scope of the present invention. All such variations and modifications are intended to be included within the scope of the invention as defined in the appended claims.

We claim:

1. A process for scouring a coating from a suture strand, comprising the steps of winding said suture strand between a plurality of mounting members, immersing said suture strand in a scouring solvent; and producing a plurality of gas bubbles moving generally along a path through a first plate having a plurality of holes, through said solvent, and against said wound of suture strand so as to agitate said wound of suture strand and said scouring solvent, wherein said wound of suture strand is placed above said holes such that said strand windings are oriented in a first direction, said gas bubbles moving through said strand windings in a second direction which is substantially perpendicular to said first direction, whereby the scouring efficiency of said solvent is enhanced.

2. The process according to claim 1, wherein said producing step includes the step of supplying pressurized gas through said holes such that said gas bubbles are produced when said pressurized gas passes through said holes.

3. The process according to claim 2, wherein said first plate cooperates with a second plate so as to form a chamber therebetween which is in communication with said holes, said holes being positioned beneath said wound of suture strand so that said gas bubbles are movable generally upwardly from said holes toward said wound of suture strand, so as to increase contact between said scouring solvent and said strand windings.

4. The process according to claim 2, comprising the steps of arranging said wound of suture strand in a shape that corresponds to a pattern in which said holes are arranged on said first plate, and mounting said wound of suture strand above said holes so that said wound of suture strand is substantially aligned with said pattern.

5. The process according to claim 2, wherein said wound of suture strand is impermeable.

6. The process according to claim 2, wherein said pressurized gas includes a chemically inert gas selected from the group consisting of nitrogen, air and oxygen.

7. The process according to claim 2, wherein said pressurized gas is supplied to said chamber at a range of between approximately 15 psi and approximately 90 psi.

8. The process according to claim 1, wherein said coating includes a spin finish.

* * * * *